United States Patent
Oryl

(10) Patent No.: US 11,331,563 B2
(45) Date of Patent: *May 17, 2022

(54) CROWN CAP GAME DEVICE

(71) Applicant: CAPS APPS Spolka z o.o

(72) Inventor: Radoslaw Oryl, Plock (PL)

(73) Assignee: CAPS APPS SPOLKA Z OGRANICZONA ODPOWIEDIALNOSCIA, Warsaw (PL)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,018

(22) Filed: Sep. 8, 2020

(65) Prior Publication Data

US 2021/0069581 A1 Mar. 11, 2021

Related U.S. Application Data

(63) Continuation-in-part of application No. 16/425,263, filed on May 29, 2019, now Pat. No. 10,765,933.

(30) Foreign Application Priority Data

May 30, 2018 (PL) .......................... 425795

(51) Int. Cl.
*A63F 9/24* (2006.01)
*A63F 9/16* (2006.01)
*A63H 33/18* (2006.01)

(52) U.S. Cl.
CPC ................. *A63F 9/24* (2013.01); *A63F 9/16* (2013.01); *A63H 33/18* (2013.01); *A63F 2009/2447* (2013.01); *A63F 2250/1026* (2013.01)

(58) Field of Classification Search
CPC ...... A63F 2009/2447; A63F 2250/1026; A63F 9/16; A63F 9/24; A63H 33/18
See application file for complete search history.

(56) References Cited

U.S. PATENT DOCUMENTS

| 1,477,139 A | 12/1923 | Lucas et al. |
| 4,322,012 A | 3/1982 | Conti |

(Continued)

FOREIGN PATENT DOCUMENTS

| WO | 2007021496 A2 | 2/2007 | |
| WO | WO-2007021496 A2 * | 2/2007 | ............. G16H 20/30 |
| WO | 2011082405 A1 | 7/2011 | |

OTHER PUBLICATIONS

"Tiny Bluetooth Sensors Kickstarter", 2016, kickstarter.com, pp. 1-16, at https://www.kickstarter.com/projects/guardyen/tiny-bluetooth-sensors-so-you-can-make-and-connect (last visited Jul. 27, 2021) (Year: 2016).*

*Primary Examiner* — Steve Rowland
(74) *Attorney, Agent, or Firm* — Andrzej Malarz, Esq.

(57) ABSTRACT

A crown cap game device characterized in that a measurement device 4, consisting of electronic board 4a, the battery 4b covered by the casing 4c, clings to the wall 6, is installed inside below the teeth 3. All electronic elements on measurement device 4 like sensors, button, led diode are located on electronic board 4a and covered by the casing 4c. The battery 4b provides power to the electronic board 4a and casing 4c covers electronic board 4a to protect electronic board 4a against the influence of external factors. Casing 4c as well as crown bottle cap 2 may be in the any other form of small item enabling to perform fast tricks in the air and on the surface like coin shape.

6 Claims, 6 Drawing Sheets

(56) References Cited

U.S. PATENT DOCUMENTS

| | | | | |
|---|---|---|---|---|
| 5,014,798 | A | * | 5/1991 | Glynn ................. G01G 11/006 177/132 |
| D468,258 | S | | 1/2003 | Guo et al. |
| D644,822 | S | | 9/2011 | Keppler et al. |
| 8,302,770 | B2 | | 11/2012 | Valentine |
| D683,581 | S | | 6/2013 | Archer |
| D714,145 | S | | 9/2014 | Skaggs et al. |
| 9,445,972 | B2 | | 9/2016 | Arad et al. |
| 2005/0029218 | A1 | | 2/2005 | Golding |
| 2009/0058663 | A1 | * | 3/2009 | Joshi ....................... H04L 67/12 340/584 |
| 2014/0266760 | A1 | * | 9/2014 | Burke, Jr. .............. G08B 21/24 340/687 |
| 2016/0324726 | A1 | * | 11/2016 | Roberts ..................... A61J 7/02 |

\* cited by examiner

CROWN CAP GAME DEVICE

This is a continuation-in-part application of the patent application Ser. No. 16/425,263, filed on May 29, 2019, claiming a priority of the to Polish Application No. P.425795, filed May 30, 2018, the contents of each of which are hereby incorporated by reference.

The object of the solution is a crown cap game device using the standard glass bottle crown caps.

The crown cap, otherwise known as the crown cork, is, next to the screw-in cap, the most popular glass bottle closure known, as it guarantees complete tightness of the bottle, and thus the preservation of the liquid contained. It is made of steel sheeting, usually coated with paint to form the manufacturer's name or logo. Inside the cap, there is a plastic layer which does not affect the taste or the odor of the liquid, and which also serves as a seal.

The dimensions of the caps are standardized, and all of them have 21 teeth which cling to the bottle.

Apart from their primary role, which is to close and seal bottles, crown caps have been long used to create various games.

The most popular games are children's cap games which all share a common element—the crown cap which is put into motion on a flat surface, using a stroke (a flick) performed with one's fingers.

Some of the most common games involve weighed caps, which are filled either with wax, modeling clay, gypsum or lead, sometimes additionally weighed with coins. They are often intricately decorated.

Many types of games involving crown caps are known.

For instance, there is the game called the "toss", where the players take turns to toss caps against a wall. The player whose cap lands closest to the wall wins and takes a cap from each of the other players.

Another example is the "battle", where the players try to hit opponent caps with their own caps, and to knock them out of the field.

In another known example of cap games called the "race", also referred to as the "peace race", the players take turns to flick their caps. The player who completes the obstacle course or a route first wins, whereas if the cap falls out of the course, the player is penalized by going back by one stroke. Additionally weighed caps have an advantage here, as they are less likely to enter into uncontrolled rolling motion. These caps are usually equipped with state flags which are either glued to the cap using modeling clay or pressed from the top using a piece of transparent plastic or stiff foil.

One of the other known games is "football", where there are two teams. In this game, one cap is designated as the ball and the players hit (flick) the ball, aiming to place it in the opponent's goal. These games are usually played on yards—directly on the asphalt or in the sandbox.

Other embodiments of the crown cap game involve computer applications or are played online, where players compete in matches using the computer, laptop, tablet or smartphone screen. These games are virtual and do not involve physical contact of the player with an actual crown cap.

In the course of these games, and particularly during tournaments, frequent disputes arise in connection with the cap movement. This applies to games involving physical contact of the player with the cap, where the cap is flicked with one's finger. Since the flicking motion is very fast, the contestants are never certain about the trajectory of the cap or about any intermediate impacts.

In this case, the VAR (Video Assistant Referee) system offers a significant opportunity to verify the results. The system is applied, among others, in football matches, and aims at preventing errors committed by in-field referees. The use of this system during crown cap tournaments and matches is however hindered due to its high price, its complexity and its large size, which makes it impossible to use anywhere games are played.

The pertinent prior art is represented, for example, by US 20110156348 A1, U.S. Pat. Nos. 5,467,985, 5,454,566, 5,351,968, US 20070057463A1, and U.S. Pat. No. 4,583,651.

The purpose of the solution is to create a crown cap game device which would combine a game consisting in its real, physical and non-virtual playing applying measurement instruments, with a mobile application for smartphones, tablets and other mobile devices, to ensure that the players compete according to the rules and that all disputes arising during games are eliminated.

The essence of the solution is a crown cap game device using crown caps, characterized in that a measurement device with a Bluetooth module is installed in the bottom of a crown cap, whereas the measurement device clings to the wall and the Bluetooth module provides a connection with a mobile device equipped with a mobile application which analyzes and displays all data from the measurement device, and then displays the data on the screen of the mobile device.

In a beneficial embodiment of the solution, a measurement device in the form of an accelerometer is installed in the bottom of the crown cap.

In a beneficial embodiment of the solution, a measurement device in the form of a gyroscope is installed in the bottom of the crown cap.

In a beneficial embodiment of the solution, measurement devices in the form of an accelerometer and a gyroscope are installed in the bottom of the crown cap.

In a beneficial embodiment of the solution, the measurement device contains a LED.

In a beneficial embodiment of the solution, an additional measurement device in the form of a magnetometer is installed in the bottom of the crown cap.

The object of the solution is presented in its various embodiments in figures referenced below.

DETAILED DESCRIPTION OF THE PREFERRED EMBODIMENTS

Figure 1:
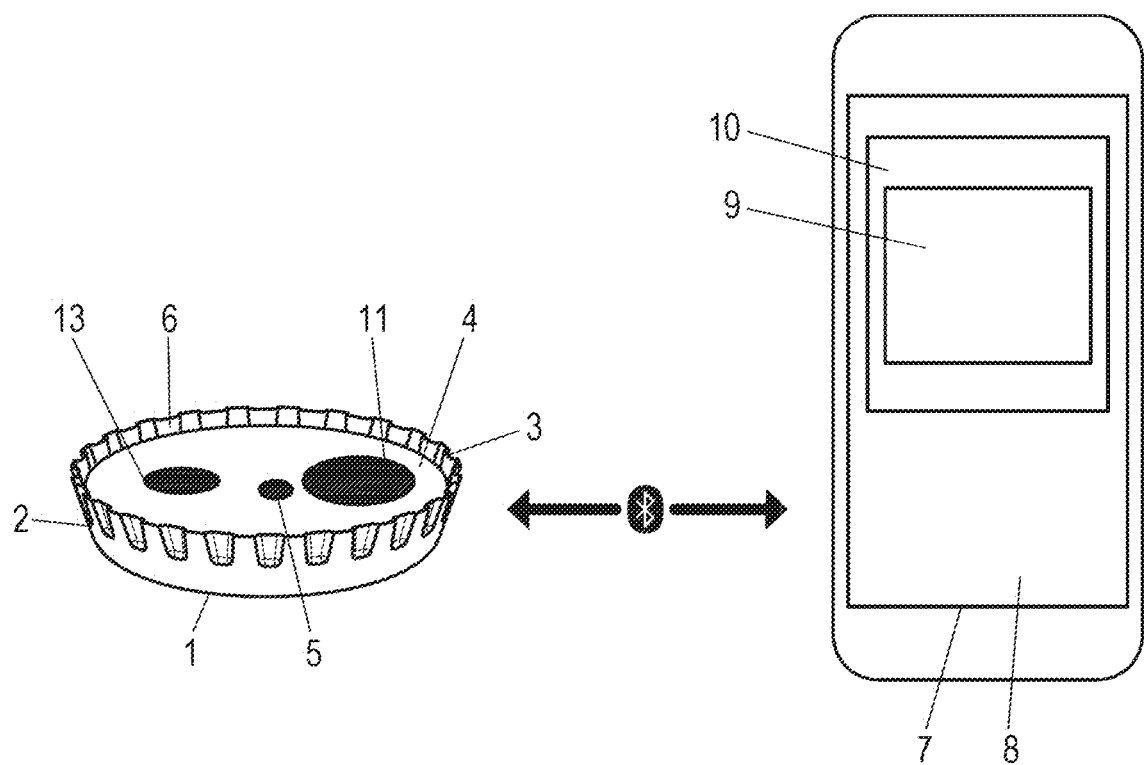
FIG. 1 shows the crown cap 2.

FIG. 1 presents a crown cap 2 where a measurement device 4 in the form of an accelerometer 11 which clings to its wall 6 is installed below the teeth 3, in the bottom 1 of the cap. The device is equipped with a Bluetooth module 5 which provides a connection with a mobile device 7. This figure includes a schematic of the mobile device 7 which is equipped with a mobile application 8. The purpose of the mobile application 8 is to analyze and display data 9 from the accelerometer 11. Using the mobile application, the user of the smartphone, tablet or any other mobile device decides which data 9 is to be analyzed and which information is to be displayed on the screen 10 of the mobile device 7. In the figure, the device in the form of an accelerometer 11 has the form of an electronic overlay placed on the cap. The figure also includes a LED 13 which can be used to visually signal the activity of the cap 2. Thanks to the Bluetooth module, the user can turn the LED 13 on via a mobile application installed on the mobile device 7, in order to identify their cap 2.

Placed next to the accelerometer 11, the Bluetooth module 5 can be used to connect to a mobile device 7, and thus to monitor and analyze the following data 9 recorded for the cap 2: impact, impact force, angle, displacement, acceleration, speed, rotation, vibration and shocks. In the accelerometer 11, three separate outputs measure acceleration in axes X, Y and Z and this information can be used to determine the majority of parameters related to linear movement for each of the axes in a coordinate system.

Thanks to the data 9 recorded by the accelerometer 11, one can determine the direction and the value of acceleration of the cap 2, and determine the force, with which it was hit, and, furthermore, to determine the speed of the cap 2, its distance, position and orientation relative to the ground. Indications obtained from the accelerometer 11 may be then used to integrate the acceleration vector in order to determine the speed vector, or to determine the displacement—by re-integrating. Placed in the bottom 1 of the cap 2, the accelerometer 11 itself is an electromechanical device sensing static or dynamic acceleration forces. Static forces include gravity, whereas dynamic forces can include vibrations and movement. Measuring static acceleration relative to gravity, one can determine the cap 2 angle relative to the ground.

Sensing the dynamic acceleration, one can analyze the movement of the cap 2. Apart from determining the values of linear accelerations, it is possible to use them to determine the spatial position of the cap, and to execute specific interactions during its movement. Thanks to the accelerometer 11, one can detect even the slightest impact, otherwise invisible to the naked eye. This solution would allow for e.g. detecting impact with another object, such as another cap.

Figure 1A:
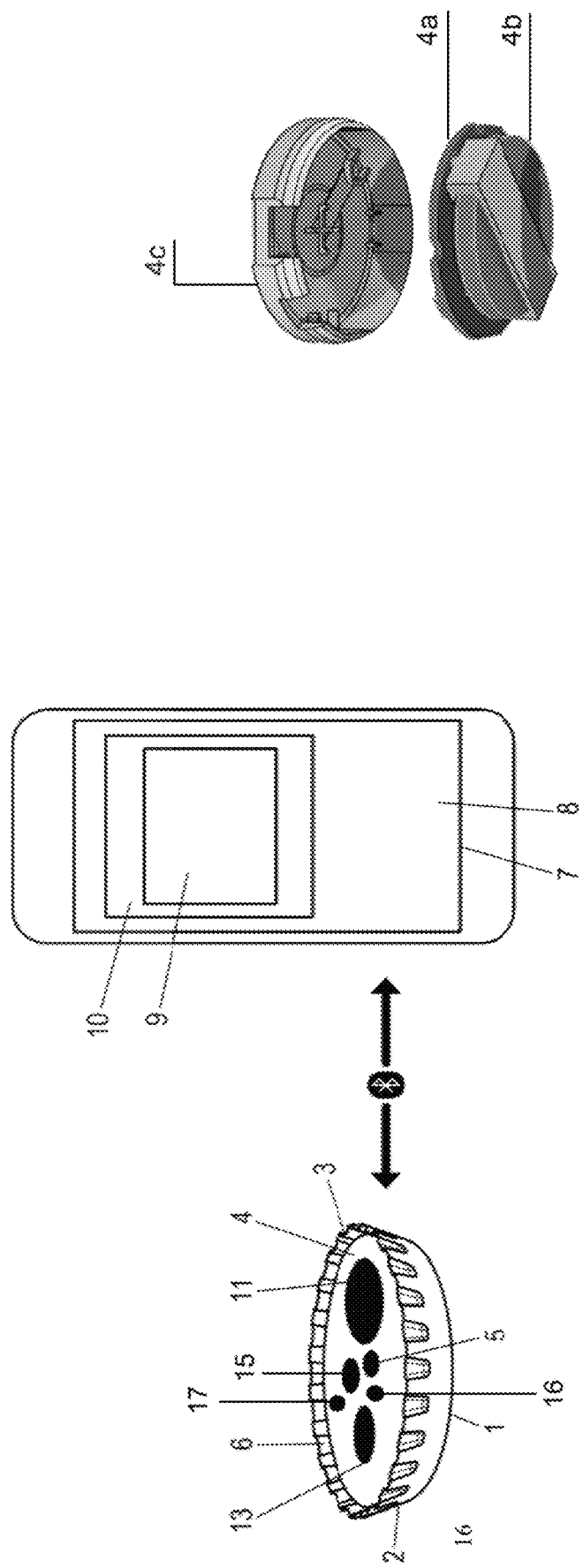
FIG. 1A shows a crown cap 2 where a measurement device 4 consisting of electronic board 4a, the battery 4b covered by the casing 4c clings to the wall 6 is installed inside, below the teeth 3.

FIG. 1A provides more detailed description of existing FIG. 1 (i.e. more detailed description of measurement device 4). FIG. 1A presents a crown cap 2 where a measurement device 4 consisting of electronic board 4a, the battery 4b covered by the casing 4c clings to the wall 6 is installed inside, below the teeth 3. All electronic elements on measurement device 4 like e.g. sensors, button, led diode are located on electronic board 4a and covered by the casing 4c. The battery 4b provides power to the electronic board 4a and casing 4c covers electronic board 4a to protect electronic board 4a against the influence of external factors. Casing 4c as well as crown bottle cap 2 may be in the any other form of small item enabling to perform fast tricks in the air and on the surface: e.g. coin shape. Measurement device 4 is installed inside the crown cap 2 where measurement device clings to its wall 6 using casing 4c and this casing 4c should not significantly exceed the bottle cap teeth height 3 thus measurement device 4 will be installed below the teeth high 3.

The device 4 is equipped with the button 15 that can be located anywhere on the top electronic board but the most valuable place is the center or nearby center area of electronic board 4a. The button 15 can be used to turn on/off electronic board 4a or for many other use cases by pressing the casing 4c. For example user can press the button it activates some action in the mobile application or led diode. Measurement device 4 is equipped with battery that can be extended to inductive charging module 16 so the bottle cap battery 4b can be charged wirelessly.

Measurement device 4 is equipped with temperature sensor 17. The temperature sensor 17 measures temperature of hand or any other object that the crown cap game device has contact with.

Figure 2:
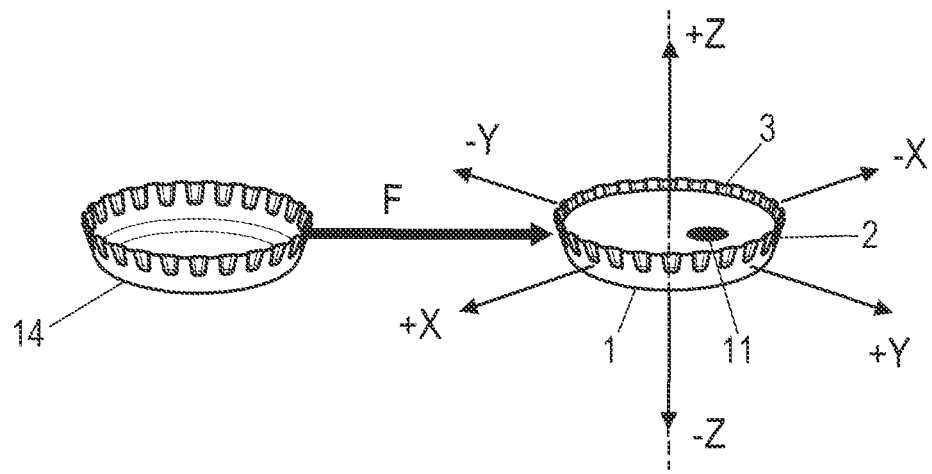
FIG. 2 shows a cap 14 hitting the cap 2.
Figure 2A:
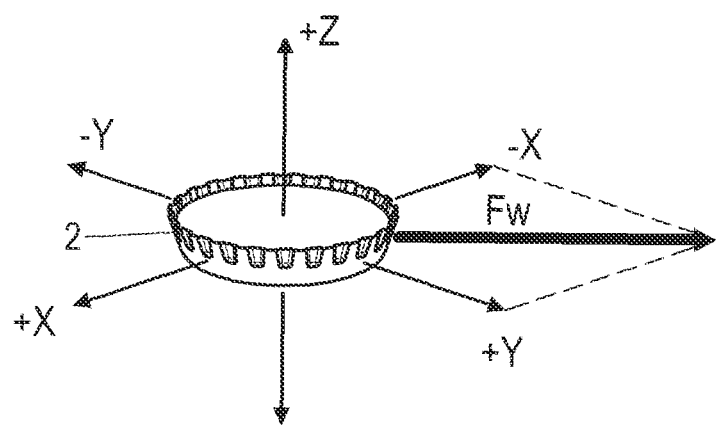
FIG. 2A shows a force which acts on the cap 2 after it is hit by cap 14.

FIG. 2 presents a situation where cap 14 hits cap 2 with a force of impact presented as vector F. In the cap 2, below the teeth 3, in its bottom 1, there is an accelerometer 11 which measures the force presented as vector $F_w$ shown in FIG. 2A. FIG. 2A displays the force which acts on the cap 2 after it is hit by cap 14. This allows for measuring the displacement, and thus the impact with another object, and the force, with which the cap 2 was hit by cap 14. In this case, it is also possible to measure the acceleration, speed and displacement of the cap 2 after impact.

Figure 3:
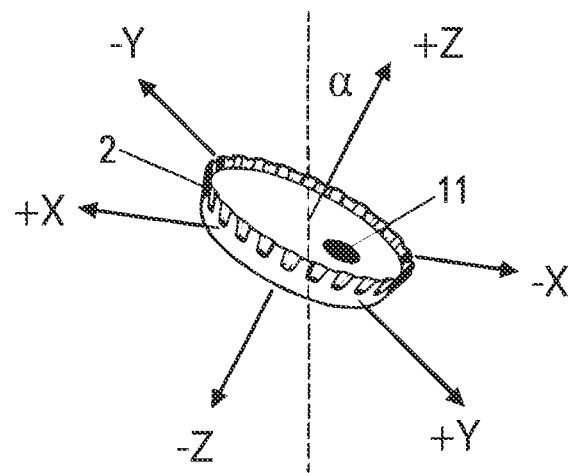
FIG. 3 shows the cap 2 changing position in axis Z by angle α in 3D space.

FIG. 3 presents a situation where the position of the cap 2 changes in axis Z by angle α in 3D space. For a three-dimensional accelerometer 11, changes in position can be detected for each of the three axes X, Y and Z.

A gyroscope is used if it is necessary to detect and measure the rotation of an object, its rotation angle, and its rotational speed. The gyroscope is primarily intended to monitor the rotations around the axis of the cap, and this type of movement differs from the remaining types, as the object in question can rotate but the force of gravity G applied on the gyroscope needs not change. Contrary to the accelerometer which measures the linear acceleration of a device, the gyroscope directly measures its orientation.

Figure 4:
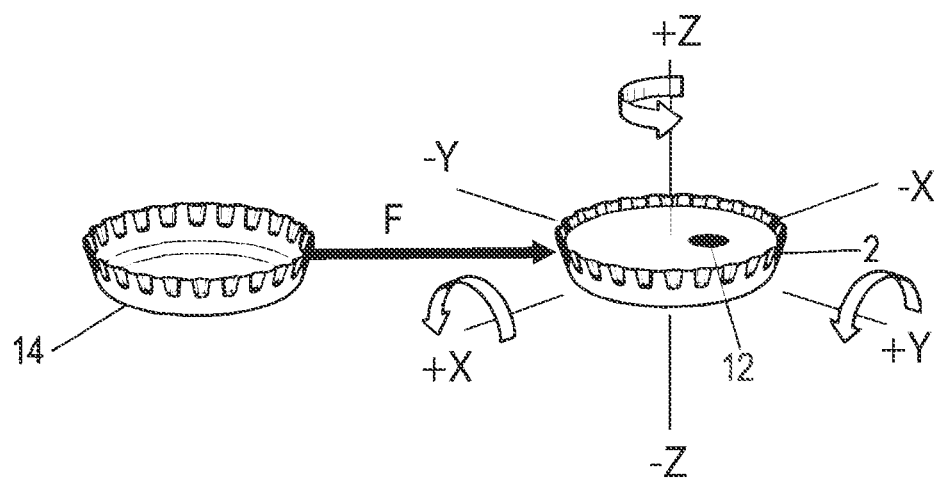
FIG. 4 shows the cap 14 hitting the cap 2 with a force having a vector of F.

The use of a gyroscope is illustrated in an embodiment of the solution in FIG. 4.

This figure presents cap 14 hitting cap 2 with a force having a vector of F. The cap 2 is equipped with a gyroscope 12. After the impact, the cap 2 is set into rotary motion. To better illustrate it, the movement was marked with thick red arrows. The gyroscope 12 detects rotations for each of three axes X, Y and Z, thus detecting impact with another object.

Figure 5:
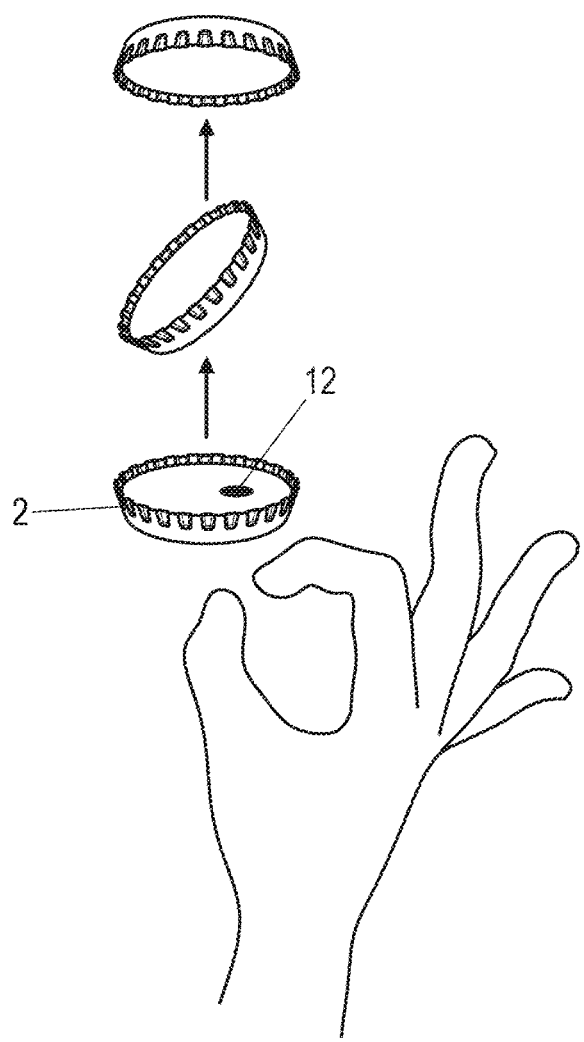
FIG. 5 shows the cap 2 equipped with a gyroscope 12.

FIG. 5 presents a cap 2 equipped with a gyroscope 12. The cap 2 revolves in the air after it is flicked by a finger upwards. In this case, the gyroscope 12 detects the number of revolutions of the cap 2 in the air.

It is also possible to combine an accelerometer and a gyroscope. In this case, the accelerometer is more accurate in static calculations, when the cap reaches a fixed reference point, whereas the gyroscope recognizes the cap's orientation when it is moving.

Figure 6:
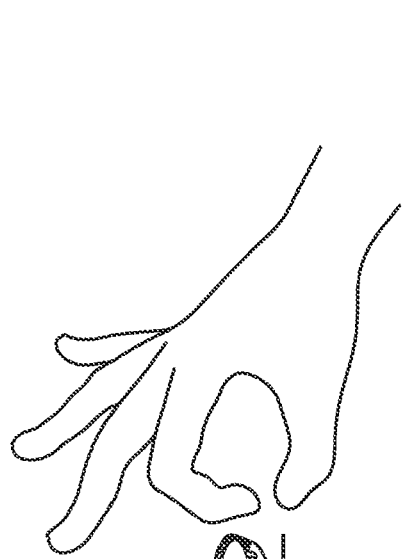
FIG. 6 shows fusion of an accelerometer 11 and a gyroscope 12.

This combination is presented in FIG. 6. This figure presents a fusion of an accelerometer 11 and a gyroscope 12. This fusion can be used to trace and analyze the behavior of the cap 2 in 3D space after impact.

Figure 7:
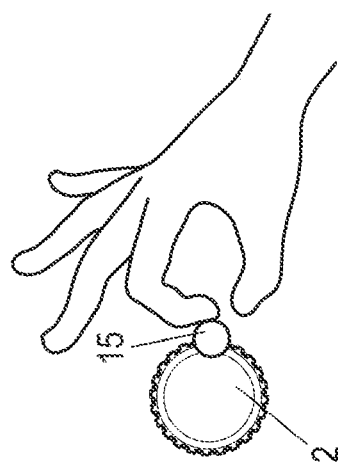
FIG. 7 shows the cap 2 flicked in the upper part.
Figure 7A:
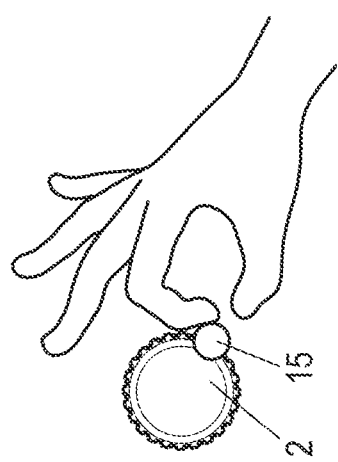
FIG. 7A shows the cap 2 flicked in the bottom part.
Figure 7B:
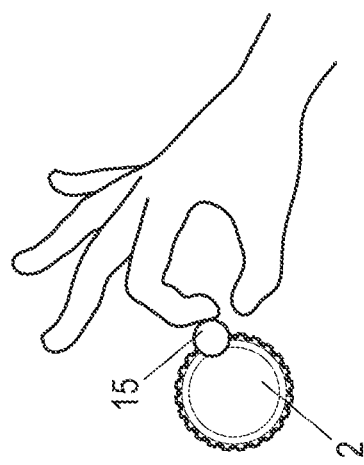
FIG. 7B shows the cap 2 flicked in the center of the cap.

FIG. 7 presents another application of an accelerometer and a gyroscope. In this figure and FIGS. 7A-B, a circle 15 marks the way, in which the cap 2 can be hit (flicked) at its different widths and heights. In FIG. 7 the cap is flicked in the upper part of the cap 2. In FIG. 7A the cap is flicked in the bottom part of the cap 2. In FIG. 7B is flicked in the center of the cap 2.

The point of impact affects the precision and force of the shot. Data from the accelerometer and gyroscope can be used to trace and analyze the behavior of the cap 2 after impact. These records can be used by the user to improve their technique.

It is also possible to use an additional measurement device in the form of a magnetometer, which was not presented in the figure. In this case, the magnetometer is installed next to the accelerometer and the gyroscope. Combining an accelerometer, a gyroscope and a magnetometer, the user can obtain more accurate data on the movements of the cap, particularly in 3D space. Thanks to the Bluetooth module, the data obtained from the device can be recorded, processed and analyzed on a mobile device using a mobile application.

Each change in the position of the cap, including among others its displacement, deflection or rotation in 3D space can be monitored thanks to the solution, which will allow for detecting the following activities of the cap: detection of impact with another object, cap acceleration, detection of an event, force, with which the cap was hit, force, with which the cap hit another object, number of cap revolutions in 3D space, current position of the cap in 3D space, analysis of movements in 3D space.

Data from the X, Y and Z axes will be used to detect the accuracy, at which the cap was hit. This affects the quality of the stroke, and particularly the acceleration, angle and rotation of the cap in motion. Each of these parameters can be sensed by the measurement device, that is by the accelerometer and the gyroscope.

Communication with a mobile device can be used to monitor, assess, and thus improve the force and technique of flicking the cap. Thanks to the solution, the player can significantly improve their technique.

The solution can be used to create a crown cap game which would combine a game consisting in its real, physical and non-virtual playing applying measurement instruments, with a mobile application for smartphones, tablets and other mobile devices.

The solution ensures that sports rivalry is always conducted according to the rules, and eliminates any disputes among the players concerning the movements and impacts of caps used in the game.

The solution will be used to play crown cap games, particularly during tournaments and competitions.

While the present invention has been described at some length and with some particularity with respect to the several described embodiments, it is not intended that is should be limited to any such particulars or embodiments or any particular embodiment, but it is to be construed with references to be appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A crown cap game device using a crown cap or other similar small object remaining a cap shape, comprising
    a measurement device configured with a Bluetooth module installed in a bottom of a crown cap, wherein
    the measurement device clings to a wall and the Bluetooth module provides a connection with a mobile device equipped with a mobile application which analyzes and displays data from the measurement device equipped with accelerometer and gyroscope, wherein the crown cap performs fast tricks in the air or on the surface, comprising a measurement device configured with a battery that can be removable and charged wirelessly.

2. The crown cap game device according to claim 1, wherein the crown cap comprises
    a measurement device configured accelerometer and gyroscope to evaluate spinning performance on the surface and tossing performance in the air.

3. The crown cap game device according to claim 1, wherein the crown cap performs fast tricks in the air or on the surface, comprising a measurement device that clings to the wall of the crown bottle cap via casing that protect electronics board from physical damages.

4. The crown cap game device according to claim 1, wherein the crown cap performs fast tricks in the air or on the surface, comprising a measurement device configured with a temperature sensor to measure temperature of environment, a hand any other object that the crown cap game device has contact with.

5. The crown cap game device according to claim 1, wherein the crown cap performs fast tricks in the air or on the surface, comprising measurement device that can be covered by any other form of small cover than a cap, enabling to perform fast tricks in the air and on the surface like coin shape.

6. The crown cap game device according to claim 1, wherein the crown cap performs fast tricks in the air or on the surface, comprising
    a measurement device configured with a button to turn on/off measurement device and many other activities associated with gaming, tricks, mobile applications and led diode.

\* \* \* \* \*